US006544416B2

(12) United States Patent
Helwig

(10) Patent No.: US 6,544,416 B2
(45) Date of Patent: Apr. 8, 2003

(54) SYSTEMS AND METHODS FOR SEPARATING SOLIDS FROM A FLUID ENVIRONMENT

(75) Inventor: Neil E. Helwig, Mason, OH (US)

(73) Assignee: Marine Biotech Inc., Beverly, MA (US)

( * ) Notice: Subject to any disclaimer, the term of this patent is extended or adjusted under 35 U.S.C. 154(b) by 42 days.

(21) Appl. No.: 09/843,218

(22) Filed: Apr. 26, 2001

(65) Prior Publication Data

US 2002/0011454 A1 Jan. 31, 2002

Related U.S. Application Data

(60) Provisional application No. 60/200,155, filed on Apr. 26, 2000, and provisional application No. 60/232,274, filed on Sep. 13, 2000.

(51) Int. Cl.[7] .......................... B01D 21/26; B01D 21/00
(52) U.S. Cl. .................. 210/304; 210/512.1; 55/459.1; 209/12.1; 209/719; 209/720; 209/725; 209/733
(58) Field of Search .............................. 210/512.1, 787, 210/788, 806, 304; 55/459.1, 447; 209/725, 733, 717, 719, 720, 12.1

(56) References Cited

U.S. PATENT DOCUMENTS

| 4,747,962 A | * | 5/1988 | Smisson | 210/512.1 |
| 5,078,875 A | * | 1/1992 | Losing | 210/512.1 |
| 5,851,396 A | * | 12/1998 | Saget | 210/512.1 |

FOREIGN PATENT DOCUMENTS

| JP | 6-2905 | * | 1/1994 |
| RU | 2043304 C1 | * | 9/1995 |

OTHER PUBLICATIONS

PTO–2002–4299 which is a Machine Translation of Unexamined Japanease Patent Application JP 6–2905 dated Jan. 1994.*
PTO–2002–4273 which is a Translation of Russian Federation Patent No. RU 2043304 C1 dated Sep. 1995.*

* cited by examiner

*Primary Examiner*—David A. Reifsnyder
(74) *Attorney, Agent, or Firm*—Foley Hoag LLP

(57) ABSTRACT

A system and method for separating solids from a fluid environment is provided. The system includes a device having housing with a substantially cylindrical upper portion and a substantially conical lower portion. The device also includes a chamber at an intersection between the upper portion and the lower portion, and an inlet in communication with the chamber for generating a cyclonic flow pattern into the conical lower portion. As the cyclonic flow with a suspension of solids is introduced into the lower portion, the flow decreases in velocity. Thereafter, the flow rises within the conical lower portion at a velocity less than the settling velocity of the solids, generated by gravitational forces, thereby resulting the separation of the solids from the fluid. The ascending fluid substantially free of solids can be collected through an upper portion, while the settled solids can be collected towards an apex of the conical lower portion and subsequently removed.

5 Claims, 2 Drawing Sheets

SYSTEMS AND METHODS FOR SEPARATING SOLIDS FROM A FLUID ENVIRONMENT

RELATED U.S. APPLICATION(S)

This application claims priority to U.S. Provisional Application Serial Nos. 60/200,155, filed Apr. 26, 2000, and 60/232,274, filed Sep. 13, 2000, both of which are hereby incorporated herein by reference.

TECHNICAL FIELD

The present invention relates to systems and methods for facilitating material separation (sedimentation) through passive means. More particularly, the present invention relates to the use of cyclonic flow and the differences in the density of the solid and liquid components for separation.

BACKGROUND ART

Solids are typically classified by using three different criteria, size, state and chemical characteristic. In addition, solids may be differentiate by one of four size categories:

Dissolved Solids are defined by having a size of less than $10^{-6}$ mm and are composed of ions and molecules that are present in the solution.

Colloidal Solids are defined by having a diameter between about $10^{-3}$ to $10^{-6}$ mm. These solids include many fine clay particles, virus and some bacteria.

Suspended Solids (non-filtrable) are defined by having a size greater than about $10^{-3}$ mm and can be trapped by a 1.2 micron filter.

Settleable Solids are a subsection of suspended solids that will settle out of solution, when left un-agitated, for instance, in an Imhoff cone, for about one hour.

Solids can be removed from solution in many ways. One of the most common is physical filtration. Physical filtration includes the use of filters, such as screens, bags, pleated cartridges, etc., and the use of gravity separators, such as sedimentation, centrifuging, and hyrodcloning. Gravity separators are normally much more passive than screen filters, but normally only remove large particles and are subject to changes in efficiency due to solid and water characteristics. Despite this, gravity separators have been utilized worldwide in the primary treatment process of wastewater.

The removal of suspended and settleable solids from solution by permitting these solids to settle by gravity is called sedimentation. Sedimentation is often a primary treatment method for wastewater containing solids, since it is a low energy, passive filtration process that can be easily harnessed. Sedimentation can take place anywhere there is a change in water velocity or hydraulic retention time (HRT), and has been accomplished by the use of a variety of devices, for instance, hydroclones, swirl separators and deceleration basins. Such devices can be as simple as a pipe increasing from, for example, 6 cm in diameter to 12 cm in diameter, to create a larger cross sectional area with decreasing the flow velocity, which can result in an increased HRT.

Present technology has employed sedimentation in combination with centrifugal force to aid in the primary treatment of suspended and settleable solids. For example, by employing a centrifugal force, the spinning motion generated therefrom can be used to increase the gravitational force on the particles to increase the settling rates.

SUMMARY OF INVENTION

The present invention provides, in accordance with one embodiment, a device for separating solids from a fluid environment. The device, in an embodiment, includes a housing having a substantially cylindrical upper portion and a substantially conical lower portion configured to collect solids which have been separated from the fluid environment. The device further includes a chamber at an intersection between the cylindrical upper portion and the conical lower portion for introducing a cyclonic flow pattern into the housing. An inlet may be provided on the chamber to introduce a suspension of solids into the housing. In one embodiment, the inlet may be positioned in tangential communication with the chamber to impart a cyclonic within the chamber. The tangential position of the inlet relative to the chamber permits the fluid introduced through the inlet to follow a cyclonic path within the chamber. A drain port may be placed at an apex of the conical portion through which separated solids can be removed. The device also include an overflow weir positioned about the cylindrical upper portion to collect fluid substantially free of solids as the fluid rises from within the housing. An weir outlet may be provided, so as to direct the fluid within the overflow weir therefrom.

The present invention also provides a method for removing solids from a fluid environment. The method includes generating a uniform cyclonic flow pattern from a fluid environment having a suspension of solids. Next, the cyclonic flow pattern may distributed into a conical volume, such that the flow pattern decreases in velocity. Thereafter, as the flow pattern rises within the conical volume, solids in suspension may be permitted to separate from the fluid and to settle towards an apex of the conical volume, leaving the ascending fluid substantially free of solids. The settling of the solids can occur by allowing the ascending fluid to move at a velocity that is less than the velocity of the settling solids. The ascending fluid that is substantially free of solids can be then removed, while the settled solids, accumulated at the apex of the conical volume, can subsequently be drained.

DETAILED DESCRIPTION OF SPECIFIC EMBODIMENTS

Figure 1:
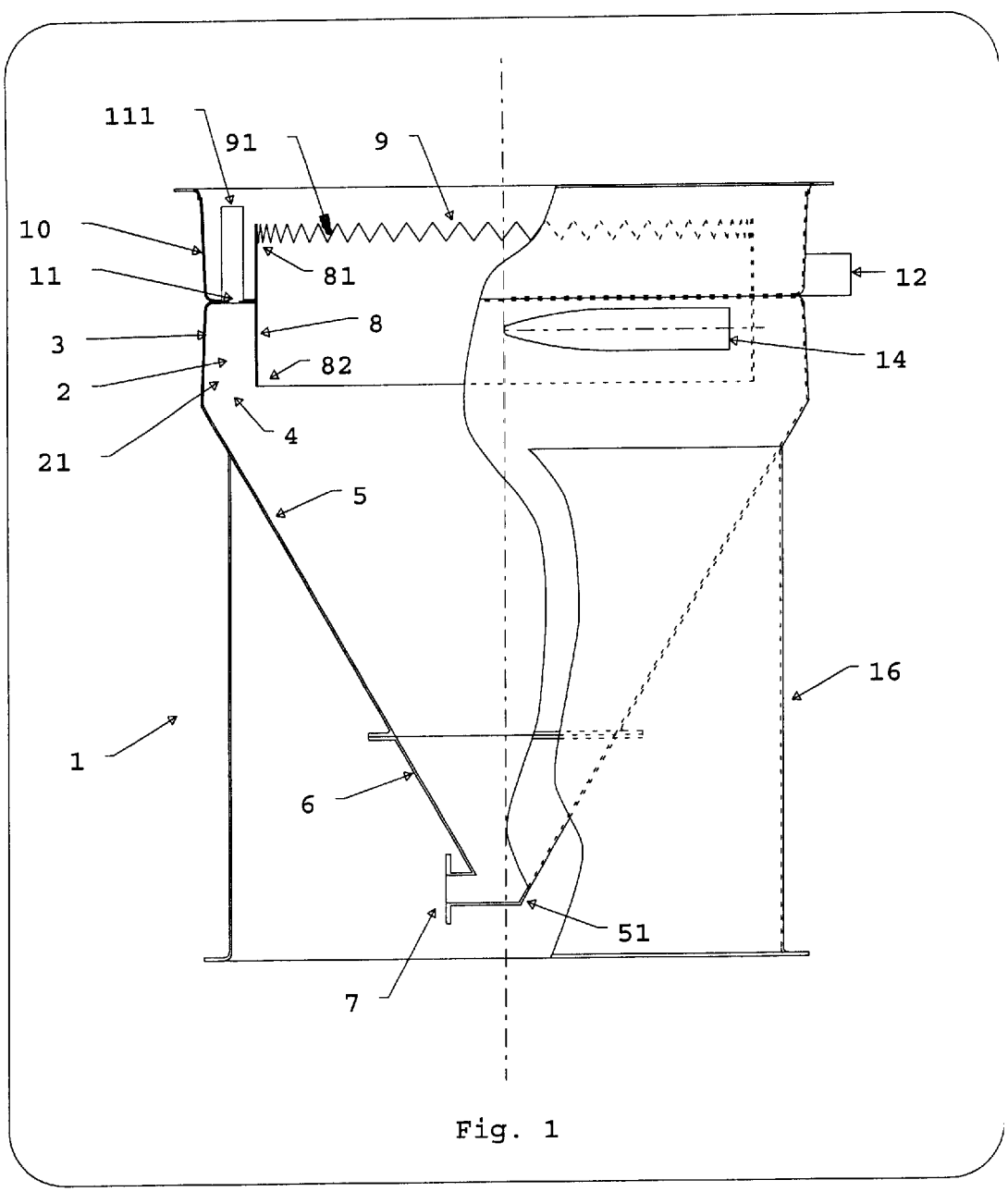
FIG. 1 illustrates, in accordance with one embodiment of the present invention, a device for separating solids from a fluid environment.

Referring now to the drawings, there is shown in FIG. 1 a device 1, in accordance with one embodiment of the present invention, for treatment of fluid, and more specifically for separation of a solid suspension from a fluid environment. The device 1 includes a housing 3 having a substantially circular upper portion 8 and a substantially conical lower portion 5 configured to collect solids which have been separated from the fluid environment. In the embodiment shown in FIG. 1, the circular portion 8 includes a first end 81 and a second end 82, around which the conical lower portion 5 is positioned.

The device 1 further includes a chamber 2 at the second end 82 of the circular portion 8 and defined by an intersection between the conical lower portion 5 and the circular upper portion 8. The chamber 2 provides an area through which the fluid along with the suspension of solids may be introduced into the housing 3. The chamber 2 may be configured to induce a substantially uniform cyclonic flow pattern to the fluid introduced therein. In particular, as fluid is introduced into the chamber 2, the fluid is directed along chamber wall 21, causing the fluid to flow at a substantially uniform velocity circumferentially about the second end 82 of the circular upper portion 8. To this end, the chamber 2 is designed to continuous and unobstructed about the second end 82 of the circular upper portion 8.

To introduced fluid into the chamber 2, an inlet 14 may be provided. The inlet 14, in one embodiment, may be situated in tangential communication with the chamber 2. The tangential position of the inlet 14 relative to the chamber 2 permits the fluid entering into the chamber 2 to flow along the wall 21, thereby generating a cyclonic flow pattern about the second end 82 of the upper portion 8 with a substantially uniform rotational velocity. It should be noted that fluid entering into the chamber 2 through the inlet 14 encounters a first flow transition as the increased cross-sectional area within the chamber 2 relative to that of the inlet 14 can cause the flow velocity to decrease. Additionally, the inertia generated as fluid moves through inlet 14 may be transferred to the chamber 2 and the centripetal force created from the cyclonic flow within the chamber 2 on the solids can aid in its separation from the fluid.

An annular opening 4 may be provided in the chamber 2 at an area between the second end 82 of circular portion 8 and conical portion 5 to provide a space through which fluid may be directed into the conical portion 5. The annular opening 4, in one embodiment, can be provided unobstructed circumferentially about the chamber 2 with a dimension sufficient to dissipate the velocity of the fluid exiting therethrough, so as to allow the fluid to be uniformly distributed downward into the conical portion 5 with a flow pattern that is capable of sweeping solids down towards an apex 51 of the conical portion 5. By providing the downward flowing pattern with decreasing velocity, localized turbulence that could resuspend solids may be minimized.

Still referring to FIG. 1, the conical portion 5, which provides an area for suspended solids to fall out of suspension and accumulate for subsequent removal, includes, in one embodiment, an inspection cone 6 towards its apex 51. The inspection cone 6 provides a location through which visual confirmation may be made as to the amount of solids accumulated within the conical portion 5. The conical portion 5 further includes at its apex 51 a solids outlet 7. The solids outlet 7 allows accumulated solids within the conical portion 5 to be removed. In one embodiment, the outlet 7 may be designed to include a valve (not shown) which may be controlled manually or otherwise (e.g., by a motor or electronically) to remove, for instance, batches of solids. In another embodiment, the solids outlet 7 may be restricted to allow a continuous low flow discharge or underflow which contains the solids to be removed.

Figure 2:
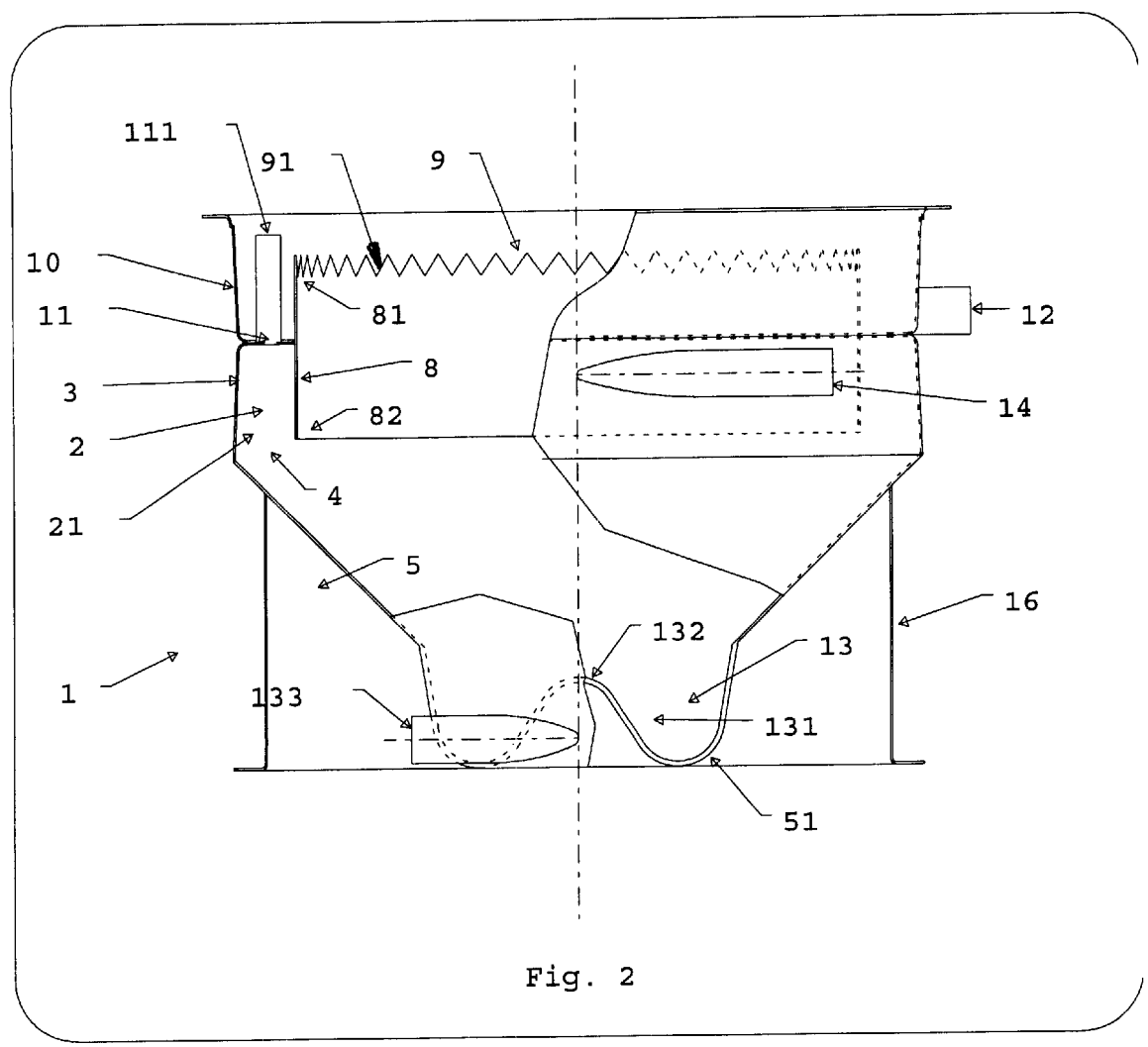
FIG. 2 illustrates, in accordance with another embodiment of the present invention, a device for separating solids from a fluid environment.

Looking now at FIG. 2, the device 1 may alternatively include a draining assembly 13, rather than inspection cone 6 and outlet 7, at the apex 51 of the conical portion 5 for removing solids accumulated within the conical portion 5. The draining assembly 13, in one embodiment, includes a substantially circular concavity 131 within which solids may accumulate. Accumulation of solids may be generated from acceleration of fluid flow along the conical portion wall 5 into the concavity 131. Although shown to be substantially circular, the concavity 131 may be designed to include other geometrical patterns which approximate a circular shape, for instance a hexagon etc., to permit the maintenance of cyclonic flow within the concavity 131. To further enhance accumulation of solids within the concavity 131, a substantially conical projection 132 may be positioned within the concavity 131. The projection 132 acts to localize cyclonic flow pattern within the concavity 131 to draw accumulated solids into the concavity 131. In an embodiment of the invention, the projection 132 is provided with a height that is not substantially higher than the top of the concavity 131.

The draining assembly 13 may further include a drain outlet 133 in communication with the concavity 131 to permit removal of solids from within the concavity 131. The drain outlet 133, in one embodiment, may be placed in tangential communication with the concavity 131 to accommodate the outflow of fluid and solids moving in a cyclonic flow pattern within the concavity 131.

It should be noted that the device 1 can be provided with a base 16 on which conical portion 5 may sit for support. The base 16, in one embodiment, may be designed for access to the inspection cone 6. Alternatively, the base 16 may be sealed to provide fluid storage.

As fluid substantially free of solids flows upwardly along the conical portion 5, the fluid may move to within the upper portion 8 of the housing 3. In one embodiment, as there must be sufficient pressure from the fluid entering the conical portion 5 to permit the fluid within the conical portion 5 to rise into the upper portion 8, the upper portion 8 may be provided with a diameter that is relatively smaller than the maximum diameter of the conical portion 5. The upper portion 8, as shown in FIGS. 1 and 2, transitions into an overflow weir 9 at the first end 81 of the upper portion 8. In one embodiment, overflow weir 9 may be provided with a serrated or undulating edge 91. It should be appreciated that such an edge 91 allows for equalization of fluid flow from the circular body 8 over the edge 91, in the event that the circular body 8 is not level. Of course, should it be desired, the edge 91 may be made even around the entire first end 81 of the upper portion 8.

A weir trough 10 may be positioned about the first end 81 of the upper portion 8. The weir trough 10 may be configured to include a diameter that is measurably larger than that of the upper portion 8. In this manner, as fluid rises from within the conical portion 5, the fluid may be pushed into the upper portion 8, over weir 9, and into the weir trough 10 for collection. An outlet port 12 may be provided in weir trough 10 to remove fluid substantially free of solids from the trough 10. In one embodiment, the outlet port 12 includes a pipe (not shown) sufficient in size and adequate in elevation to allow removal of fluid from the trough 10 without creating head requirements, within the trough 10, that is greater than the difference between the elevation of the upper portion 8 extending above the bottom of the trough 10 and a bottom edge of the serrated edge 91. The outlet port 12 may be positioned in tangential communication or otherwise with the trough 10.

An air bleed port 11 may also be provided at the bottom of the trough 10 and extends into the chamber 2 to a point higher than the level of cyclonic flow within the chamber 2. The bleed port 11, as illustrated in FIG. 1, permits air that may have been trapped within the chamber 2 to be removed from the chamber 2. To prevent fluid from the trough 10 from entering into the chamber 2, the bleed port 11 may be accompanied by a standpipe 111 which extends above the fluid level in trough 10.

In operation, fluid with a suspension of solids may be directed (e.g., by using a pump or by gravity) from a source through the inlet 14 and into the chamber 2. As the fluid is introduced through the inlet 18, which may be in tangential communication with the chamber 2, the fluid is permitted to flow along the wall of the chamber 2 resulting in a cyclonic flow pattern circumferentially about the circular upper portion 8. The cyclonic flow pattern within the chamber 2 continues to move downward towards the annular opening 4, and subsequently exits through the annular opening and into the conical portion 5. As the fluid moves across the annular opening 4, it is uniformly distributed into the conical portion 5 while its relative velocity is decreased. As additional fluid moves into the conical portion 5, the level of fluid in the conical portion 5 rises in a direction substantially transverse to the incoming fluid. During this ascending period, solids in suspension may separate from the fluid and fall out of suspension, based on the relative density of the solids and gravitational force, to settle towards the apex 51 of the conical portion 5. In order to permit gravity to act on the suspended solids and cause the solids to fall out of suspension, the fluid exiting from the annular opening 4 is provided with an ascending velocity that is less than the settling velocity of the solids caused by gravity.

The ascending fluid which is substantially free of solids may continue to rise toward the upper portion 8 of the housing 3. It should be noted that the smaller diameter of the upper portion 8 relative to the diameter of the conical portion 5 slightly restricts the flow of fluid into the upper portion 8, and creates an upflow velocity, which acts to maintain the solids within the housing 3 and prevent the solids from being removed through the upper portion 8. This is because in order move through the upper portion 8, the solids must overcome the upflow velocity moving in a direction opposite the downward direction of the solids. To generate such an upflow, the inlet 14, in one embodiment, may be provided with a diameter sufficient to generate a pressure capable of driving the fluid that is substantially free of solids within the conical portion 5 and into the upper portion 8. Once the ascending fluid substantially free of solids has risen to the level of the weir 9, it overflows into and is collected in weir trough 10 for subsequently removal through outlet port 12.

It noted above, in order to facilitate fluid flow over weir 9, inlet 14, in one embodiment, is provided with a diameter sufficient to generate a pressure capable of driving the fluid within the conical portion 5 into the upper portion 8 and into trough 10. Moreover, the position of the inlet 14 is preferably at a level lower than serrated edge 91 of weir 9. In this manner, the fluid entering through the inlet 14 and into the conical portion 5 may be provided with a laminar flow, so as minimize agitation of the existing fluid within the conical portion 5, which could resuspend the settled solids. Furthermore, the laminar flow into the conical portion 5 can act to push solids which have settled away from the apex 51 down towards the apex 51.

While the invention has been described in connection with specific embodiments thereof, it will be understood that it is capable of further modification. For example, the size of the various components of the device 1 may be modified to accommodate various applications. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. A device for separating solids from a fluid environment, the device comprising:

a housing having a substantially cylindrical upper portion and a substantially conical lower portion within which the upper portion is received, the conical lower portion configured to collect solids which have been separated from the fluid environment;

a chamber positioned circumferentially about a lower end of the upper portion at an intersection between the upper portion and the conical lower portion to generate a cyclonic flow pattern within the housing;

an inlet on the chamber to introduce a suspension of solids and fluid into the housing; and a drain port positioned on the conical portion through which the separated solids can be removed.

2. A device as set forth in claim 1, wherein the drain port is positioned at an apex of the conical portion.

3. A device as set forth in claim 1, wherein the drain port includes a draining assembly having:

an substantially circular concavity;

a substantially conical projection rising from within the concavity to localize cyclonic acceleration of the cyclonic flow pattern to draw the separated solids into the concavity; and an outlet in communication with the interior of the concavity to permit removal of the separated solids from within the concavity.

4. A device as set forth in claim 1, further including a weir trough positioned about the cylindrical upper portion to collect overflowing fluid as the fluid rises from within the housing.

5. A device as set forth in claim 4, further including an outlet port on the weir trough to permit removal of collected overflow fluid from the trough.

* * * * *